Patented Dec. 29, 1953

2,664,360

UNITED STATES PATENT OFFICE 2,664,360

MANUFACTURE OF CELLULOSE

Frank R. Charles and Julian A. Dixon, Hawkesbury, Ontario, Canada, assignors to Canadian International Paper Company, Montreal, Quebec, Canada, a corporation of Quebec, Canada No Drawing. Application August 20, 1951,
Serial No. 242,798

6 Claims. (Cl. 106—123)

This invention relates to new and useful improvements in the manufacture of cellulose, and especially cellulose suitable for conversion into viscose rayon, cellophane, sausage casings, cellulose derivatives such as nitrocellulose, cellulose acetate and the like, and other cellulosic products. Particularly, this invention relates to the manufacture of cellulose from wood or woody materials and has many advantages over previous wood pulps when employed to make viscose rayon. The process disclosed herein is also applicable to the processing of cotton which is to be used for similar purposes.

In the manufacture of the highest quality wood cellulose, wood is debarked and chipped, and the wood is treated at elevated temperatures and pressures with solutions of chemicals. Such chemicals are either bisulphites, usually of calcium, magnesium or ammonium and containing an excess of free $SO_2$ in solution, or are alkaline solutions of sodium hydroxide, sodium sulphide, sodium carbonate, or mixtures of these. At the conclusion of this treatment the softened chips are disintegrated into wood pulp. Such wood pulp contains small but significant proportions of lignin, tannins and other coloring matter, and organic solvent-extractable materials such as fats, fatty acids, resinous acids, sterols and hydrocarbons. The organic solvent-extractable materials are collectively termed "resin." The wood pulp produced as described above, which is mainly cellulose, is purified and bleached by one of several known processes for reaching commercially acceptable levels of purity of the cellulose. As the art of purifying cellulose has improved, resulting in nearly pure cellulose with a very small content of non-cellulosic constituents, many advantages have accrued, particularly in the properties of the rayon or other derivatives manufactured from such purified cellulose. Examples of such properties are color and strength. At the same time certain difficulties have arisen in the processing of such cellulose. For example, the lowering of the resin content of rayon-grade cellulose has given rise to difficult filtration of the viscose made from it.

Simultaneously, conditions in the rayon-making industry have changed, particularly in the direction of higher speeds in various processing steps, requiring cellulose which will process more rapidly.

We have discovered that these difficulties can be overcome and a superior pulp for processing can be made by adding to the cellulose at a late stage in its manufacture one or more ethenoxy N-monoethanolamides of refined tall oil. Such products have the generic formula:

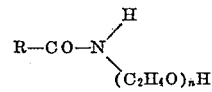

Where R is an alkyl and/or aryl radical derived from refined tall oil and $n$ is an integer between 4 and 50.

Black liquor soap, as formed in the manufacture of wood pulp by the sulphate or Kraft process, is removed from the pulp mill recovery system and converted to crude tall oil. The crude tall oil may be refined by steam distillation, solvent extraction, or other methods to provide the intermediate material from which the condensation products used in accordance with the teachings of this invention may be formed. The condensation products to be used in accordance with this invention are prepared by first reacting a refined tall oil with monoethanolamine in substantially equimolecular quantities at temperatures sufficiently high to produce a monoethanolamide of the refined tall oil, followed by condensation of the amide with from 4 to 50 mols of ethylene oxide per mol of the amide to form an ethenoxy N-monoethanolamide of refined tall oil. One such product which has been found satisfactory in the practice of the present invention may be formed from a refined tall oil known as "Acintol D," as presently manufactured by the Arizona Chemical Company and consists approximately of 33% abietic acid, 5% unsaponifiable materials and the balance of fatty acids, generally unsaturated of 18 carbon atoms. Other refined tall oils will be found equally suitable for the purposes of this invention, although the above mentioned material has proven to be particularly satisfactory.

As far as we know condensation products made from ethylene oxide and the amides of tall oil acids are new, and this invention is believed to represent the first use of such products for improving the manufacture of cellulose derivatives.

These chemicals show remarkable stability in the viscose process being stable under both the alkaline conditions of viscose preparation and the acid conditions of the spinning bath.

Benefits will be conferred by 4 to 50 ethylene oxide units in the ethenoxy portion of these amide condensation products, but best results are obtained with 10 to 30 ethylene oxide units.

We have found that small quantities of these products added to the cellulose confer very marked benefits. Among advantages found in the manufacture of viscose rayon is improved shredding of the alkali-cellulose, less power being required to shred the sheets to the same degree of comminution. The xanthation reaction is more uniform, with an apparent possibility of economy in carbon disulphide requirements, and there is a substantial reduction in the unreacted fibre content of the viscose and therefore much improved filtration of the viscose. Spinning is improved, spinnerette incrustation reduced and rayon strength improved. The fatigue of rayon tire cord is improved.

Cellulose manufactured according to this invention also has special advantage in the manufacture of dull yarn made with suspensions of pigments and oils in the viscose since the suspensions are much more fine grained and stable and the spinning proceeds with many fewer interruptions due to plugging or constriction of spinneret holes.

These products can be added easily to the cellulose. One way is to apply them in dilute aqueous solution to the cellulose at an early stage in the drying of the pulp sheet, in such a way that the added water is evaporated during the further drying of the sheet. An aqueous solution may be sprayed on the cellulose sheet or it may be applied by means of rolls. Narrow stripes may be applied by means of discs as it has been found that sufficient dispersion occurs in the shredding stage.

In accomplishing the objects of this invention it is not necessary to use more than 0.2% on the weight of cellulose and usually 0.01% to 0.1% is sufficient.

The following two examples will illustrate preferred embodiments of this invention, but the invention must not be construed as limited to these examples.

*Example 1*

A 10% aqueous solution of a product obtained by reacting a refined tall oil ("Acintol D") acid amide with 25 mols of ethylene oxide was sprayed continuously across a sheet of cellulose passing through a pulp drying machine at such a rate that 0.1% was added based on weight of bone dry cellulose. The sheet was dried to the normal moisture content (about 7%). The cellulose treated in this manner exhibited the following desired improvements, namely, improved shredding of the alkali-cellulose, more uniform xanthation reaction, substantial reduction in the unreacted fibre content of the viscose and therefore improved filtration of the viscose, improved spinning, reduced spinneret incrustation, improved rayon strength and lesser fatigue of rayon tire core.

*Example II*

A 50% solution of a product obtained by reacting a refined tall oil ("Acintol D") acid amide with 20 mols of ethylene oxide was applied to high quality refined sulphite pulp by means of $\frac{1}{16}''$ face discs dipping into the liquid heated to 65° C. The dried cellulose sheet was passed over the discs causing them to rotate and imprint the compound on the cellulose sheet. The spacing of the discs was such that 0.1% of the compound was added, based on the weight of cellulose.

The cellulose treated in this fashion exhibited the following improvements in processing into 1650 denier 720 filament high strength viscose rayon tire yarn, spinning at 100 metres per minute:

|  | Treated wood pulp | Untreated wood pulp |
|---|---|---|
| Shredding of alkali-cellulose: |  |  |
| Percent retained on $\frac{1}{4}''$ mesh screen after 1½ hours' shredding | 4.0 | 8.5 |
| Nature of alkali-cellulose crumb | (¹) | (²) |
| Viscose filtration: Weight in grams filtered through a $\frac{1}{4}''$ diameter disc of Canton flannel before filter plugged | 126 | 100 |
| Rayon strength: |  |  |
| Grams per denier, bone dry | 4.00 | 3.94 |
| Percent elongation, bone dry | 16.1 | 15.9 |
| Grams per denier, conditioned | 3.55 | 3.35 |
| Percent elongation, conditioned | 20.9 | 19.9 |
| Grams per denier, wet | 2.16 | 2.07 |
| Percent elongation, wet | 24.4 | 24.4 |
| Tire cord (1650 denier 2 ply cord): |  |  |
| Grams per denier, bone dry | 3.33 | 3.23 |
| Percent elongation, bone dry | 11.0 | 10.9 |
| Grams per denier, conditioned | 2.86 | 2.75 |
| Percent elongation, conditioned | 14.3 | 14.7 |
| Fatigue, D. B., minutes | 40.8 | 34.2 |

¹ Soft, fluffy and reactive.
² Rather hard in feel.

Thus it will be seen that marked improvements are effected in alkali-cellulose shredding, viscose filtration and tire cord fatigue, while noticeable improvements are seen in almost all of the remaining properties tested.

The presence of these products also reduces the degradation of bleached viscose rayon that occurs on prolonged heating. The following results were obtained after bone-drying bleached rayon in an oven at 105° for 16 hours and then reconditioning for 24 hours before testing:

|  | Treated wood pulp | Untreated wood pulp |
|---|---|---|
| Grams per dealer | 3.53 | 3.04 |
| Percent elongation | 21.4 | 18.4 |

Many variations of this process will suggest themselves to those skilled in the art, but such variations are considered as falling within the scope of this invention, provided the products employed are within the class described.

The products may be added at any stage up to and including the viscose itself, but with diminishing benefits. This will be obvious from our disclosure since addition to the viscose, for example, cannot give improved shredding or any of the other benefits derived in the manufacturing of the viscose. However, addition even to the viscose itself confers the substantial advantages of improved dispersion and stability of pigments and oils, better spinning with fewer breaks, less spinneret incrustation, more first grade yarn, higher rayon strength, and resistance of bleached rayon to degradation by heating.

We claim:

1. In the manufacture of regenerated cellulose from sheeted purified chemical wood pulp by the viscose process, the step of incorporating into said process at a stage subsequent to the formation of the pulp sheets but prior to regeneration from 0.01% to 0.2% of ethenoxy N-monoethanolamides of refined tall oil wherein the number of ethylene oxide units is from 4 to 50 per amide molecule.

2. A method for improving the processibility of purified chemical wood pulp which comprises adding to said purified chemical pulp the ethenoxy N-monoethanolamides of refined tall oil, wherein the number of ethylene oxide units is from 4 to 50 per amide molecule, said amides being added in an amount from 0.01% to 0.2% based on the bone dry weight of said pulp.

3. A method for improving the processibility of purified chemical wood pulp which comprises adding to said purified chemical pulp the ethenoxy N-monoethanolamides of refined tall oil in an amount from 0.01% to 2.0% based on the bone-dry weight of said pulp, said refined tall oil before condensation consisting approximately of 33% abietic acid, 5% unsaponifiable materials and the balance of fatty acids, generally unsaturated of 18 carbon atoms.

4. A method for improving the processibility of purified chemical wood pulp which comprises adding to said purified chemical pulp the ethenoxy N-monoethanolamides of refined tall oil, wherein the number of ethylene oxide units is from 4 to 50 per amide molecule, said tall oil before condensation consisting approximately of 33% abietic acid, 5% unsaponifiable materials and the balance of fatty acids, generally unsaturated of 18 carbon atoms.

5. In the manufacture of regenerated cellulose products by the viscose process, the step of incorporating into viscose ethenoxy N-monoethanolamides of refined tall oil wherein the number of ethylene oxide units is from 4 to 50 per amide molecule, said amides being added in an amount from 0.01% to 0.2% based on the weight of the cellulose content of the viscose.

6. In the manufacture of regenerated cellulose products by the viscose process, the step of incorporating into viscose ethenoxy N-monoethanolamides of refined tall oil wherein the number of ethylene oxide units is from 4 to 50 per amide molecule, said refined tall oil before condensation consisting approximately of 33% abietic acid, 5% unsaponifiable materials and the balance of fatty acids, generally unsaturated of 18 carbon atoms, said amides being added in an amount from 0.01% to 0.2% based on the weight of the cellulose content of the viscose.

FRANK R. CHARLES.
JULIAN A. DIXON.

References Cited in the file of this patent

UNITED STATES PATENTS

| Number | Name | Date |
|---|---|---|
| 1,970,578 | Schoeller et al. | Aug. 21, 1934 |
| 2,002,613 | Orthner et al. | May 28, 1935 |
| 2,331,935 | Schloesser et al. | Oct. 19, 1943 |
| 2,393,817 | Schloesser et al. | Jan. 29, 1946 |
| 2,423,469 | Schloesser et al. | July 8, 1947 |
| 2,432,128 | Schloesser et al. | Dec. 9, 1947 |